Figure 1:
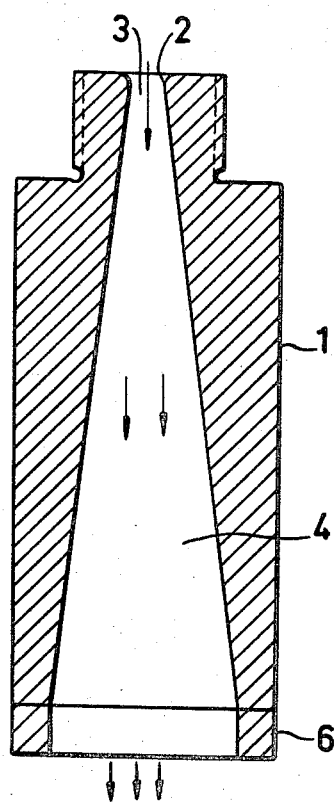

United States Patent Office 3,420,450
Patented Jan. 7, 1969

3,420,450
NOZZLE MEANS FOR BREAKING FOAM
Carl Arne Bergholm, Sundsvall, Sweden, assignor to Svenska Cellulosa Aktiebolaget, Sundsvall, Sweden
Filed May 3, 1965, Ser. No. 452,528
U.S. Cl. 239—601                    3 Claims
Int. Cl. B01d *47/04;* B05b *1/10*

In industrially handling liquids of the kind having a pronounced tendency to foam, such foaming may cause considerable trouble. An example of inconvenient foaming is the one occurring in so-called filter washing plants, in connection with the manufacture of cellulose according to the sulphate process, where it has been necessary, up to now, to provide very large foam-separating tanks together with other, space-requiring and energy-consuming equipment in order to make it possible to put the filter washing process into practice. Due to the fact that the foam from a multistage filter washing system, operating according to the counter-flow principle, hitherto—in the absence of effective foam breakers—has been collected in a common foam separating tank, the efficiency of counter-flow washing becomes reduced. Due to this the average concentration of the obtained black liquor becomes relatively low, which involves increased costs for the evaporation of the liquor. In addition to chemical foam-breaking agents, also mechanically operating devices have been in industrial use for the purpose of breaking foam. As examples of mechanical foam breakers there may be mentioned apparatus of the kind in which the foam is caused to pass through a perforated sheet of metal or is thrown against a wall, and also rotating foam breakers, in which the foam is broken up while passing through a fan-like rotor. Foam-breaking has also been carried out by directing jets of air, or liquid, against the surface of the foam to be broken. However, none of the abovementioned methods and devices, respectively, has proved entirely satisfactory for breaking foam of great strength, in spite of the fact that the energy consumption often has been a considerable one. At times it even happens that the foam becomes stabilized within the rotating apparatus, because of the fact that the foam bubbles are broken up into still smaller bubbles.

The present invention, which has for its object to eliminate the hitherto existing drawbacks in connection with the breaking of foam, generated in industrial processes, such as the fermentation of so-called black liquor, or the handling of such liquor, within the sulphate cellulose industry, comprises a method as well as means for breaking foam in an effective and economical maner.

The invention is based on the principle that foam bubbles, by being subjected to a sudden, short and rapid acceleration, can be caused to burst and, on bursting, to form droplets suspended in the gas, substantially air, that was previously within the foam bubbles. The sequence in connection with the breaking of the foam may be explained to be as follow. Due to the acceleration the film of each individual bubble becomes subjected to a force which tends to tear the film apart. Said force substantially is proportional to the mass of the film and also to the acceleration. The mass of the film is determined by the thickness and the surface of the film and also by the density of the liquid forming the film. If the acceleration force, to which the film is subjected, should become more than twice the surface tension of the film, i.e. more than twice the contractive force to which the film is subjected per unit of length of an imagined section of the film, then the bubble will burst. An approximate calculation, based on a bubble diameter of two millimeters and a volume weight of the foam of 50 kilogs./m.³ and a surface tension of 75 dynes/cm., shows that there is required an acceleration of at least $10^5$ cm./s.², i.e. about 100 grams, to break the films of the bubbles, said films having a thickness of about $15\mu$. Consequently, the breaking of foam, consisting of large bubbles, is more easily carried out than the breaking of foam consisting of small bubbles. At a given diameter of the bubbles, heavy foam is more easily broken than light foam. Due to this it is necessary to accelerate the foam rapidly so that no liquid shall have time to leave the films of the bubbles, thereby making them lighter. However, tests have shown that it is not sufficient to subject the foam only to a short, rapid acceleration. As a matter of fact, also the velocity of the jet, resulting from such a rapid acceleration and consisting of gas (air) with droplets of liquid suspended therein, has to be reduced to such a low value that the gas (air) and the droplets, suspended therein, may be separated from each other and the droplets be united to form a liquid, which is led away to the desired place.

In carrying out the above described process it is preferred to accelerate the foam by forcing (pressing or sucking) the same through a duct of little length and converging in a high degree in the direction of flow of the foam, said duct having a guide surface presenting a well rounded curvature. The foam having passed through the narrowest section of said inlet duct, which section may be circular or shaped as a narrow slot, the velocity of the foam is decreased rapidly by causing the foam to pass through another duct which, however, diverges in the direction of flow (i.e. forming a diffusor). The length of said diverging duct preferably is considerably larger than the length of the converging duct. When treating easily broken foam the velocity of the foam, on passing through the slot, may be as low as 4 meters/sec. but, ordinarily, it amounts to at least 10 meters/sec. When treating difficultly broken foam the maximum velocity may, however, amount to 100 meters/sec. The foam is sucked through the converging duct by means of a vacuum pump, the suction pipe of which is connected to the outlet end of the diffusor. The medium transported by the vacuum pump consists of the gas (air), which is contained in the suspension of droplets of liquid and gas (air) and which has become freed from the droplets of liquid.

The invention also comprises means for putting the above described process into practice. In point of principle, such means may be embodied in many different ways, but one preferred way is to shape it as a nozzle, comprising an inlet duct of little length and converging in a high degree in the direction of flow of the foam, the guide surface of said inlet duct having a well rounded curvature. Through its narrowest portion, which forms a narrow passage or opening, said inlet duct is connected to a diffusor of the abovementioned kind.

Figure 4:
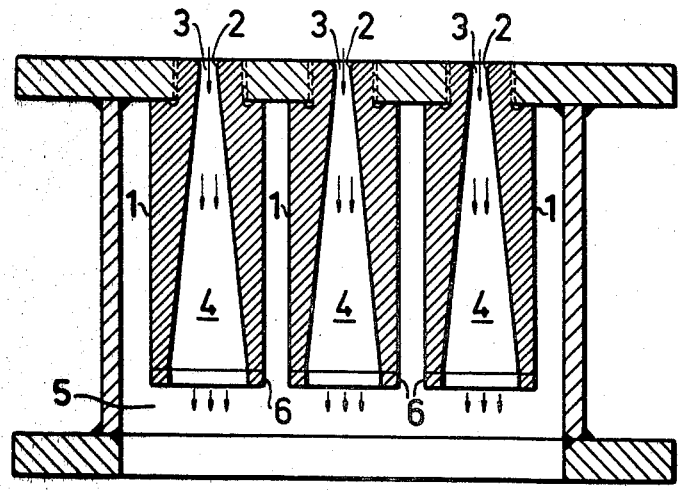
Figure 5:
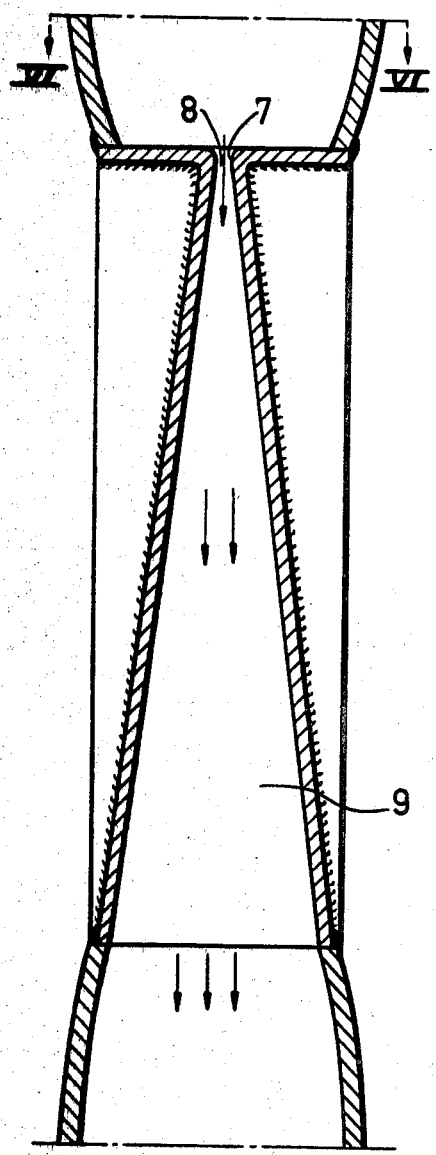
Figure 6:
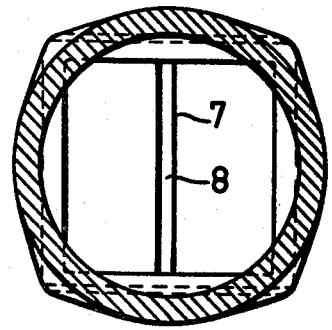
Figure 7:
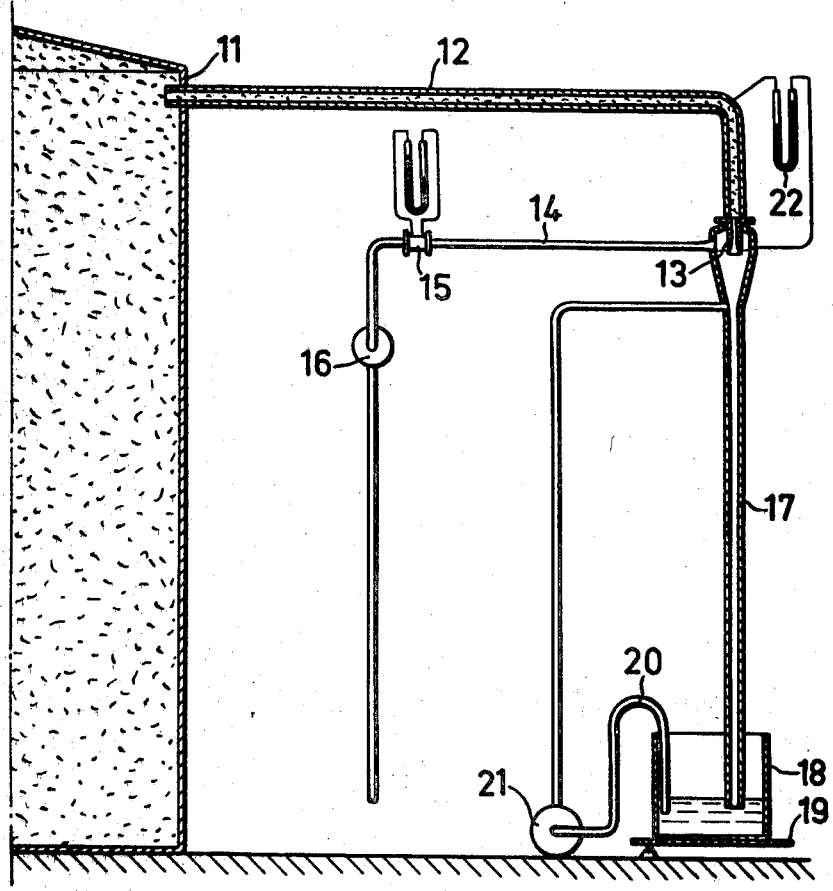

Two different embodiments of apparatus according to the invention are shown diagrammatically in the accompanying drawings. FIGURES 1–4 show the first embodiment, in which the converging duct, its narrowest portion and the following, diverging duct (diffusor) all have a circular cross sectional area of flow, whereas FIGURES 5 and 6 show the second embodiment, in which the narrowest portion is in the shape of a narrow slot having an elongated, rectangular cross sectional area of flow. FIGURE 7, finally, shows diagrammatically, how the invention is put into practice in accordance with the first example, out of three, which will be described later.

The two embodiments will be described below, in detail, reference being had to the various figures of the drawings.

Figure 2:
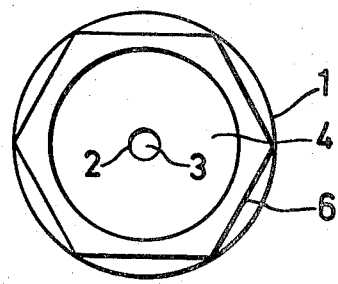
Figure 3:
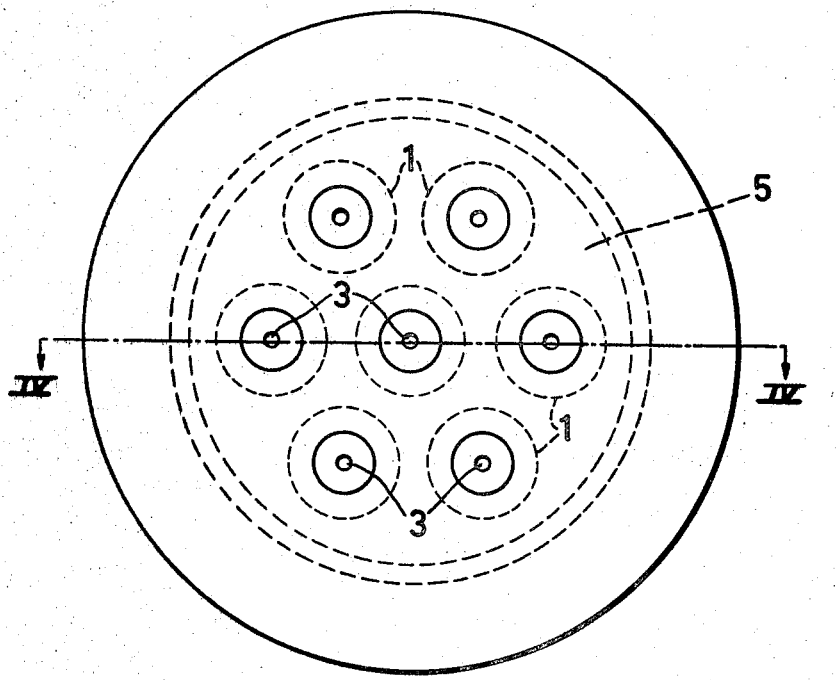

FIGURE 1 shows a vertical, cross sectional view of the nozzle-like device according to the first embodiment, and FIGURE 2 shows the same when viewed from below. FIGURE 3 is a plan view of a unit, for industrial use, composed of seven nozzles of the kind shown in FIGURES 1 and 2, and FIGURE 4 is a vertical cross sectional view of such a unit on the line IV—IV, of FIGURE 3. The nozzle, which has no movable parts, is indicated, generally, by 1. Said nozzle comprises a very short inlet duct 2, converging in a high degree in the intended direction of flow of the foam and having a well rounded inlet wall, which by way of the narrowest opening 3 of the nozzle merges into a conically widening duct 4 having a relatively small angle of aperture (<15°), said duct 4 being long in comparison with the inlet duct 2 and constituting a diffusor, adapted to be connected to a succeeding collecting chamber for the foam transformed into the liquid state. Such collecting chamber preferably consists of a cylindrical chamber. Said chamber may be common to a plurality of apparatus, as shown in FIGURES 3 and 4, in which the cylindrical chamber is designated by 5. Thus, the apparatus in question is constructed for functioning in accordance with the principle, upon which the present invention is based, i.e. the foam to be treated—said form consisting of bubbles, formed by films of liquid, which enclose gas, substantially air—is first subjected to a sudden, short and rapid acceleration, resulting in the bubbles bursting and the foam being transformed into droplets, suspended in the gas (air) which, prior to the bursting of the bubbles, was inside the bubbles, and that the suspension, thus formed and moving at a great speed through the nozzle, being then gently retarded in such a high degree that the gas (the air) and the droplets, suspended therein, can be separated from each other and the droplets be united to form a liquid, which is led away to any desired place. The diameter of the opening 3 preferably is 2 millimeters at least and preferably 20 millimeters at most. It has turned out to be more effective to use a nozzle having an opening of a small diameter than to use a nozzle having an opening of a larger diameter. On the other hand a nozzle, having an opening of a larger diameter, has a greater capacity than a nozzle having an opening of a smaller diameter, whereby also the costs of erection become smaller. A suitable compromise regarding the minimum size of the diameter of the opening has turned out to be between about 5 millimeters and about 10 millimeters. The nozzle may be made of plastics, by pressing, and may also be provided with an end portion 6 having, for example, a hexagonal contour and serving for engagement with assembling or erecting tools. In FIGURE 2 said end portion 6 is shown from below. The nozzle has a maximum breaking capacity of 1.400 m.³ of foam per hour.

In the second embodiment according to FIGURES 5 and 6, FIGURE 5 shows a vertical sectional view of the apparatus, FIGURE 6 showing a section along the line VI—VI, of FIGURE 5. In this embodiment the short, converging inlet duct 7 with its opening 8 has the shape of a long, rectangular slot, extending in one and the same horizontal plane, and the diffusor duct 9 has a rectangular cross sectional area of flow.

According to still another embodiment (not shown) the narrow passage or opening in the converging duct of the nozzle, serving for the acceleration of the foam, together with said second duct, serving for the retardation of the foam, has a substantially annular cross sectional area of flow.

*Example 1*

In connection with the separation of black liquor and pulp, obtained in the sulphate digestion process, use is often made of so-called filter washing, which is, fundamentally, carried out by means of a number of rotating drum filters. Entrained air generates large quantities of foam, which normally are collected in foam tanks, in which the foam is broken up slowly. On one occasion foam was sucked out from the top of such a tank 11 (FIGURE 7), the volume of which was not large enough to admit breaking of all the foam. The foam was sucked out through a pipe 12, having an inner diameter of 50 millimeters. The pipe 12 opened vertically into a nozzle 13, the narrowest section of which had a diameter of 7 millimeters. The separated air, through a pipe 14 and a throttle valve 15, was led to a vacuum pump 16. The separated liquid was removed through a fall pipe 17, having a length of four meters and an inner diameter of 70 millimeters. At its lower end the pipe 17 opened into a smaller container 18, placed on a weigher 19. From the container 18 there extended a circulation pipe 20 provided with a pump 21, by which the flow through the pipe 17 could be increased, if required. The fall of pressure above the nozzle 13 was gauged by means of a manometer 22.

The foam had a volume weight of 76–100 kilogs./m.³ before the nozzle 13 and 600–650 kilogs./m.³ after the nozzle, which shows that the major part of the foam had been broken up. At a pressure drop of 560 millimeters of water column an amount of 1.4 m.³ of foam per hour passed through the nozzle and at a pressure drop of 880 millimeters of water column an amount of 2.1 m.³ passed therethrough. These amounts of flow correspond to the velocities of, respectively, 18 and 27 meters/second at the narrowest section of the nozzle.

*Example 2*

Tall oil soap, separated partly from weak liquor in connection with filter washing in a sulphate cellulose plant, partly from partially concentrated liquor, proved to contain such a large amount of gas, enclosed in foam, that the average volume weight was as low as 250–300 kilogs./m.³ Because of this the production, in a following plant for the splitting off of the soap by means of acid, became highly reduced. In view hereof there was connected, at the end of the soap pipe, a number of units, each having seven nozzles in accordance with FIGURES 3–4. The soap pipe had an inner diameter of 200 millimeters and the diameter of the smallest opening of each nozzle was 7 millimeters. By means of a gear pump the soap was pumped through the nozzles, the velocity through the narrowest section of the nozzles being about 6 meters/second. At a pressure drop above the nozzles, amounting to about two atmospheres, an average amount of foam-containing soap of 5.7 m.³ per hour was treated by one unit of nozzles, by which the volume weight increased to 800–900 kilogs./m.³ The soap, which was practically free of foam, was allowed to fall freely into the respective reaction apparatus for the splitting off of the soap, the separated gas being allowed to escape through an opening in the top of the apparatus. The vertical drop of the compressed soap amounted to 0.5–4 meters, depending on the extent to which the apparatus was filled.

*Example 3*

Breaking of foam from black liquor, having a density of about 15% total solids and having had an extra amount of soap of about 3% added thereto, was carried out in the following manner: The foam, which was generated in an apparatus with injection of air and vigorous stirring, had a volume weight of 50 kilogs./m.³ and was sucked through a pipe having an inner diameter of two inches (50.80 millimeters) to a nozzle, the smallest diameter of which was 10 millimeters. Complete breaking of the foam was obtained and the liquid resulting from the foam flowed down substantially along the walls of the diffusor and was then collected in a container. From the container the air was sucked away continuously by means of a vacuum pump. At a quantity of foam of 4.7 liters/second the velocity of flow amounted to 60 meters/second at the narrowest section of the nozzle. The pressure drop above the nozzle, measured by means of a manometer, amounted to 55–70 millimeters of column of mercury. If the amount of foam was reduced to 3.5 liters/second the foam was, however, incompletely broken and the pressure drop then became as high as 175 millimeters of Hg. For the treatment of weaker foam a lower speed was required. In certain cases even an air current, moving at a speed of 4 meters/second, proved sufficient for completely breaking the foam. In the first mentioned case the consumption of energy was only 3 kw. hr. per 1.000 m.³ of foam.

Having now described my invention, what I claim as new and desire to secure by Letters Patent is:

1. A nozzle for apparatus for breaking foam of black liquor, comprising a sharply converging inlet duct and a slightly diverging outlet duct, the axial length of which exceeds considerably the axial length of said inlet duct, the outlet end of said inlet duct being connected to the inlet end of said outlet duct by a smoothly curved wall defining an opening having substantially the same size and shape as the smallest cross-section of each of said ducts, characterized in that the axial length of said inlet duct is less than half of the diameter of said opening and that the outlet duct has the shape of a frustum of a cone, the apex of which has an angle of less than 15°.

2. A nozzle as defined in claim 1, in which the diameter of said opening is from 2 to 20 mm.

3. A nozzle as defined in claim 1, in which the diameter of said opening is from 5 to 10 mm.

References Cited

UNITED STATES PATENTS

| 1,182,543 | 5/1916 | Ferguson | 55—95 |
| 2,385,522 | 9/1945 | Malott | 55—178 |
| 2,813,833 | 11/1957 | Revallier | 55—53 |
| 2,519,531 | 8/1950 | Worn | 55—47 |
| 3,101,906 | 8/1963 | Webber | 239—601 |

FOREIGN PATENTS 880,593  10/1961  Great Britain.

SAMIH N. ZAHARNA, *Primary Examiner.*

CHARLES N. HART, *Assistant Examiner.*

U.S. Cl. X.R.

55—53, 87, 178; 239—556, 566